United States Patent
Suenaga

(10) Patent No.: US 7,280,485 B2
(45) Date of Patent: Oct. 9, 2007

(54) METHOD AND APPARATUS FOR DIAGNOSING FC-AL SYSTEM LINK

(75) Inventor: Masaya Suenaga, Tokyo (JP)

(73) Assignee: NEC Corporation, Tokyo (JP)

( * ) Notice: Subject to any disclaimer, the term of this patent is extended or adjusted under 35 U.S.C. 154(b) by 1049 days.

(21) Appl. No.: 10/167,392

(22) Filed: Jun. 13, 2002

(65) Prior Publication Data

US 2002/0191537 A1 Dec. 19, 2002

(30) Foreign Application Priority Data

Jun. 14, 2001 (JP) ............................. 2001-180240

(51) Int. Cl.
*G01R 31/08* (2006.01)
(52) U.S. Cl. ..................... 370/241; 370/217; 370/242
(58) Field of Classification Search .................... None
See application file for complete search history.

(56) References Cited

U.S. PATENT DOCUMENTS

| | | | | |
|---|---|---|---|---|
| 5,942,989 | A * | 8/1999 | Nagasawa et al. | 370/236 |
| 5,991,891 | A * | 11/1999 | Hahn et al. | 714/4 |
| 6,356,984 | B1 * | 3/2002 | Day et al. | 711/147 |
| 6,504,817 | B2 * | 1/2003 | Oldfield et al. | 370/217 |
| 6,578,158 | B1 * | 6/2003 | Deitz et al. | 714/11 |
| 6,697,875 | B1 * | 2/2004 | Wilson | 709/245 |
| 6,877,044 | B2 * | 4/2005 | Lo et al. | 710/2 |
| 6,975,590 | B2 * | 12/2005 | Killen et al. | 370/225 |
| 2001/0011357 | A1 * | 8/2001 | Mori | 714/25 |
| 2002/0181406 | A1 * | 12/2002 | Iwata et al. | 370/249 |

FOREIGN PATENT DOCUMENTS

| | | |
|---|---|---|
| JP | 9-34653 | 2/1997 |
| JP | 11-306644 | 11/1999 |
| JP | 11-353126 | 12/1999 |
| JP | 2000-174845 | 6/2000 |
| JP | 2000-215086 | 8/2000 |

* cited by examiner

*Primary Examiner*—Duc Ho
(74) *Attorney, Agent, or Firm*—McGinn IP Law Group, PLLC

(57) ABSTRACT

Upon detection of a fault of a loop or any of disk apparatuses 30, 40, and 50, an FC-AL control unit 15 notifies an MPU11 of contents of the fault. The MPU11 records a fault history for each disk apparatus in a memory circuit 12 and also sets an order in which the disk apparatuses 30, 40, and 50 are to be disconnected, based on the fault histories. If the link fault occurs, the disk apparatuses 30, 40, and 50 are disconnected from the loop in thus set disconnecting order. If the link failure occurs on the port A side loop 1, a disk adapter 10 supplies a port bypassing-related instruction to its counterpart disk adapter 20 to thereby control bypassing/bypassing releasing on the port A side through the port B side loop 2.

20 Claims, 12 Drawing Sheets

FIG.2

| Disk apparatus<br>Fault classification | Disk #0 | Disk #1 | Disk #2 | Disk #3 | .... |
|---|---|---|---|---|---|
| Number of I/O fault occurring times | 1 | 2 | 3 | 0 | .... |
| Number of transfer time-out occurring times | 2 | 1 | 2 | 0 | .... |
| Number of link abnormality occurring times | 3 | 3 | 1 | 0 | .... |
| Number of I/O fault occurring times for overall loop | 6 ||||
| Number of transfer time-out occurring times for overall loop | 5 ||||
| Number of link abnormality occurring times for overall loop | 7 ||||

METHOD AND APPARATUS FOR DIAGNOSING FC-AL SYSTEM LINK

BACKGROUND OF THE INVENTION

1. Field of the Invention

The present invention relates to a method and apparatus for diagnosing a link of a Fiber Channel Arbitrated Loop (FC-AL) system and, more particularly to, an FC-AL system link diagnosing method and apparatus for guessing a node highly possible to encounter a fault in a loop based on each node-specific fault history to, upon occurrence of a loop-related fault such as a link fault etc., disconnect the nodes from the loop in a descending order of the fault occurrence possibilities, thus detecting the node at which the fault occurred.

2. Description of the Related Art

As one system for interconnecting a computer and a storage apparatus is known a fiber channel, one connection form of which is also known an FC-AL. A variety of apparatuses connected to the fiber channel are called a node (node apparatus). The FC-AL employs such a link type (loop type) connection form that transmission units and reception units of FC ports make a round in a row over a plurality of nodes. Any system having such an FC-AL connection form, therefore, may be suspended in operation as a whole if a fault occurs at any of its nodes. To guard against this, each of the node is provided with a port bypass circuit in configuration so that a node where a fault occurred may be disconnected from the loop.

Japanese Patent Application Laid-Open No. Hei 11-353126 discloses a disk array connecting system which can easily identify a faulty apparatus to reduce time required in the identification processing. In this disk array connecting system, if a fault occurs, a loop of the system is disconnected once, so that then an initiator is connected with disk array apparatuses one by one sequentially for checking to thereby identify the apparatus where the fault occurred. When the faulty apparatus is thus identified, it is disconnected from the loop to then use another apparatus to restore the loop.

Japanese Patent Application Laid-Open No. 2000-174845 discloses a fiber-channel arbitration type loop faulty port detecting/excluding system and method for implementing unmanned early detection/exclusion of a port responsible for occurrence of a fault in an FC-AL. This faulty port detection/exclusion system and method utilizes one of the doubled loops to conduct bypass/enable control on a port where a fault occurred in order to exclude this port.

Japanese Patent Application Laid-Open No. 2000-215086 discloses a fault information collecting apparatus for, upon occurrence of a fault in a system connected to an FC-AL, automatically bypassing each port of an apparatus connected to a hub by linking a variety of types of monitors and then executing a testing/diagnosing program to collect information of the fault and manage the information as paired with log information.

Conventionally, if a link fault occurs in an FC-AL connected system, nodes are disconnected from the loop one by one sequentially while checking whether the link fault is recovered, thus searching for the node responsible for the fault. By this conventional method, however, the nodes must be checked sequentially until a port where a fault occurred is detected, so that this port cannot be detected early in some cases. The more nodes connected to the loop, the longer time it takes to detect a faulty port, during which ordinary input/output processing etc. cannot be performed.

SUMMARY OF THE INVENTION

In view of the above, it is an object of the present invention to provide an FC-AL system link diagnosing method and apparatus which can set an order in which nodes are subjected to port bypassing based on a node-specific fault history beforehand to conduct port bypassing in thus set order, thereby identifying the node where a fault occurred as early as possible.

In order to achieve above-mentioned object, an FC-AL (Fiber Channel Arbitrated loop) system link diagnosing method according to present invention comprising the steps of: managing a fault history for each of a plurality of node apparatuses; setting a disconnecting order in which said node apparatuses are to be disconnected on the basis of said fault history. That is, setting disconnecting order so that the disconnecting order is decided according to a value of faulty occurring possibility of each node referring said fault history. Upon occurrence of a link fault, each node is disconnected in order of link fault possibility from most highly fault possibility node to lower, thereby it is possible to find out a fault node quickly.

Moreover, said fault history records therein the fault contents and it's specific number of occurring times. And the specific number of occurring times is multiplied by each weighting coefficient for each fault content, then a sum of the multiplied value is calculated for each node. Each sum is set as suspect values, and each node is disconnected in order of the sum from largest node to smaller, thereby it is possible to find out a fault node quickly.

Furthermore, if the suspect value of a node apparatus decided to be responsible for the link fault is smaller than that of any other node apparatus, each weighting coefficient is changed in value so that the suspect value of the node apparatus decided to be responsible for the link fault may be larger than the suspect value of any other node apparatuses, thereby it is possible to learn a calculation condition of suspect values, and it is possible to improve a probability of estimation of a suspect node apparatus.

Moreover, if the suspect value reaches to predetermined threshold for diagnosing, performing a plurality of accesses for diagnosing to the node apparatus, thereby accelerating a extraction of fault history.

Furthermore, if the suspect value of any node apparatus reaches to predetermined fault threshold value (larger than the threshold for diagnosing), performing port bypassing the node apparatus, thereby disconnecting the node from the loop. The node apparatus having highly fault possibility is disconnected from the loop, thereby it is possible to prevent link fault.

BRIEF DESCRIPTION OF THE DRAWINGS

FIG. 2 is a table for indicating one specific example of fault data stored in a memory circuit;

DESCRIPTION OF THE PREFERRED EMBODIMENTS

The following will describe embodiments of the present invention with reference to the accompanying drawings.

Figure 1:
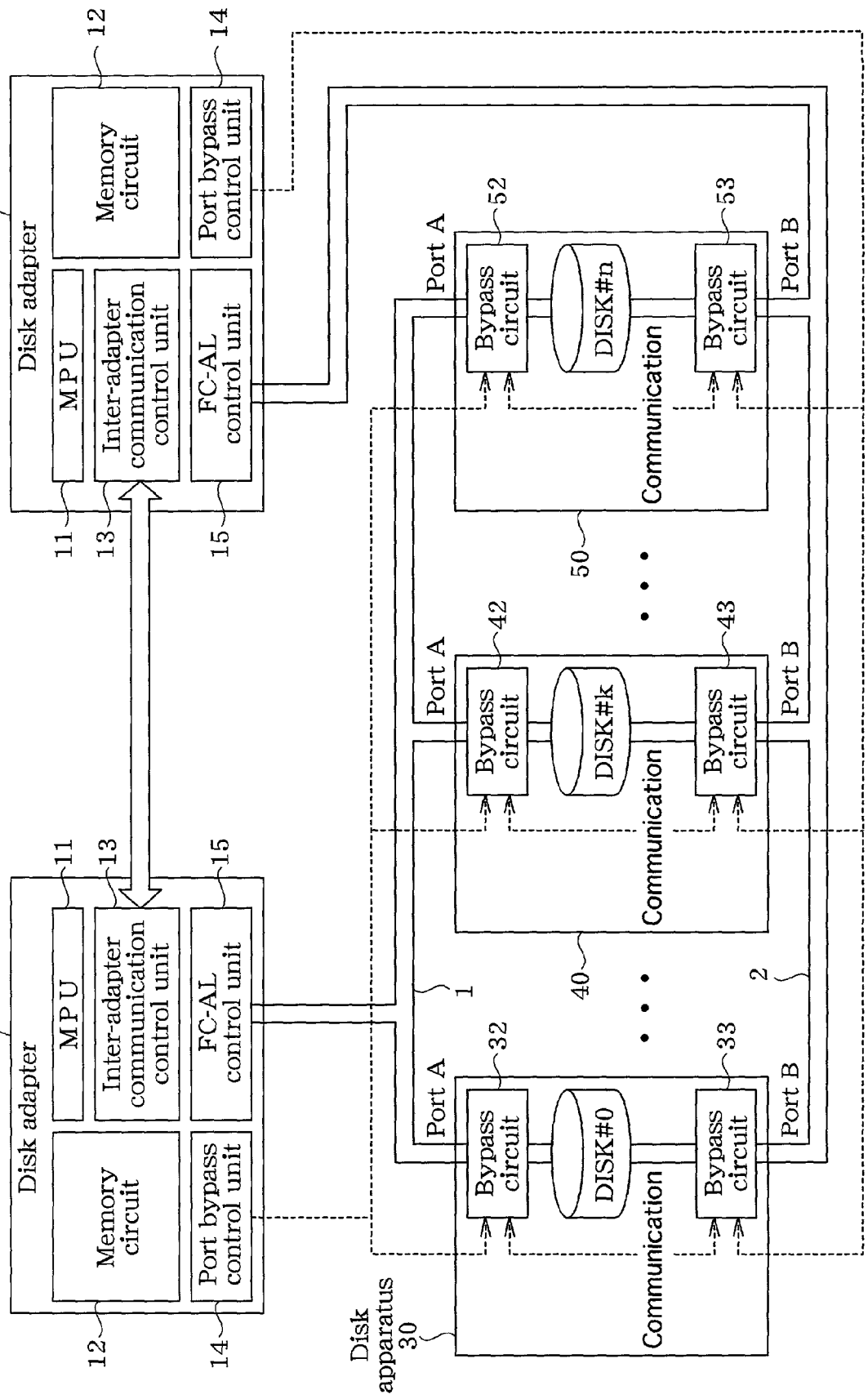
FIG. 1 is a block diagram of a configuration of an FC-AL system equipped with a link diagnosing apparatus related to the present invention.

FIG. 1 specifically shows a double-loop configuration disk array system given as one specific example of an FC-AL system. This FC-AL system comprises two disk adapters 10 and 20, a plurality of disk apparatuses 30, 40, and 50, and two loops 1 and 2 connecting above-mentioned adapters and disk apparatuses.

The disk apparatuses 30, 40, and 50 each have two FC ports (port A and port B) to accommodate the FC-AL standards and can process commands such as a read/write command through these ports. One of these ports, that is, a Port A, of each of these disk apparatuses 30, 40, and 50 is connected to one of the loops, that is, a loop 1. To this loop 1 is connected one of the disk adapters, that is, a disk adapter 10. This configuration permits the disk adapter 10 to make access through the loop 1 to each of the disk apparatuses 30, 40, and 50. The other port (port B) of each of the disk apparatuses 30, 40, and 50 is connected to the other loop, that is, a loop 2. To this loop 2 is connected the other disk adapter, that is, the disk adapter 20. This configuration permits the disk adapter 20 to make access through the loop 2 to each of the disk apparatuses 30, 40, and 50.

The disk apparatuses 30, 40, and 50 are provided with bypass circuits 32, 42, and 52 respectively for the port A and also with bypass circuits 33, 43, and 53 respectively for the port B. According to a port BYPASS instruction and a bypass RELEASE instruction and a bypass RELEASE instruction supplied through the loops 1 and 2 from the disk adapter 10 and 20, the bypass circuits 32, 33, 42, 43, 52, and 53 disconnect the disk apparatuses 30, 40, and 50 from the loops 1 and 2 and connect these disk apparatuses 30, 40, and 50 to the loops 1 and 2, respectively. In an ordinary operation, the bypass circuits 32, 42, and 52 on the side of the port A are controlled by the disk adapter 10, while the bypass circuits 33, 43, and 53 on the side of the port B are controlled by the disk adapter 20. The bypass circuits 32, 42, and 52 on the port A side can communicate with the bypass circuits 33, 43, and 53 on the port B side. By virtue of this configuration, if a link abnormality occurs in one of the loops, the other loop can control the bypass circuits on the side of this faulty loop.

The disk adapters 10 and 20 each are a controller which comprises an MPU11, a memory circuit 12, an inter-adapter communication control unit 13, a port bypass control unit 14, and an FC-AL control unit 15. The disk adapters 10 and 20 each have a redundant configuration, so that in the ordinary operation, either of these disk adapters 10 and 20 can control the FC-AL disk apparatuses 30, 40, and 50.

The memory circuit 12 stores information called statistics information which classifies the number of error occurring times with respect to error types so that the stored statistics information can be referenced from the MPU11. As shown in FIG. 2, the statistics information to be stored consists of the number of error occurring times for each disk/port classified with respect to error types. In this embodiment, the memory circuit 12 consists of a nonvolatile memory or a battery backed-up RAM etc. The memory circuit 12, however, may consist of an auxiliary memory such as a hard disk apparatus etc.

The FC-AL control unit 15 makes access through the loop to the disk apparatuses 30, 40, and 50. The FC-AL control unit 15, if supplied with I/O error information from the disk apparatus which it accessed, supplies the MPU11 with both disk identification information which identifies this accessed disk apparatus and information which notifies it of I/O error occurrence. The MPU11, when supplied with the disk identification information and error occurrence notification information, increments by one (+1) a value of an I/O error occurring times number data storage region for that disk provided in the memory circuit 12 (I/O error occurring times number counter of that disk apparatus). Note here that the MPU11 may store, in the memory circuit 12, the data of a date when an I/O error occurred in correspondence to the relevant disk apparatus.

When the FC-AL control unit 15 supplied any one of a variety of commands (I/O request etc.) to any one of the disk apparatus 30, 40, and 50 and if it could not receive a response for the command from the disk apparatus within a preset time lapse, it supplies the MPU11 with the disk identification information identifying the disk apparatus and information notifying it of occurrence of a transfer time-out. The MPU11, when supplied with these information items, increments, by one (+1), the value of a transfer time-out occurring times number data storage region (transfer time-out occurring times number counter) for the relevant disk apparatus provided in the memory circuit 12. Note here that the MPU11 may store, in the memory circuit 12, the data of a date when a transfer time-out occurred in correspondence to the relevant disk apparatus.

If a link fault occurred in the FC-AL loop and a disk apparatus responsible for the link fault was identified by later-described diagnosis, the FC-AL control unit 15 supplies the MPU11 with the disk identification information identifying that disk apparatus and the information notifying it of the occurrence of the link fault. When supplied with these information items, the MPU11 increments, by one (+1), the value of a link fault occurring times number data storage region (link fault occurring times number counter) for the relevant disk provided in the memory circuit 12. Note here that the MPU11 may store, in the memory circuit 12, the data of a date when a link fault occurred in correspondence to the relevant disk apparatus.

If the value of any one of these counters is updated, the MPU 11 calculates by operations the number of occurring times for the overall loop to then update the data of this number. If, for example, an I/O error (I/O fault) occurred at disk #0 and the number of I/O error (I/O fault) occurring times for disk #0 is incremented by one (+1), the MPU 11 obtains a total sum of the numbers of I/O fault occurring times for all of the disk apparatuses constituting the loop and then stores thus obtained total sum in the I/O fault occurring times number data storage region for the loop. Note here that the MPU 11 may, instead of obtaining the total sum, increment the I/O fault occurring times number by one (+1) each time an I/O fault is detected. In this case, each time a transfer time-out is detected, the MPU11 increments the number of transfer time-out occurring times for the loop by one (+1). The MPU 11 increments the number of link abnormality occurring times for the loop by one (+1) each time a link abnormality is detected.

By the above operations, as shown in FIG. 2, in the memory circuit 12 are stored the number of fault occurring times for each disk apparatus and for each fault type and also the number of fault occurring times for the overall loop for each fault type. As mentioned above, the one disk adapter 10 controls the loop 1 for the port A side and so its memory circuit 12 stores the number of occurring times of each type of the faults in the loop 1 for the port A side. Also, the other disk adapter 20 controls the loop 2 for the port B side and so its memory circuit 12 stores the number of occurring times of each type of the faults in the loop 2 for the port B side.

The MPU 11 calculates a suspect value X(n) using the following Equation 1.

$$X(n)=W1*A(n)+W2*B(n)+W3*C(n) \quad (1)$$

where A(n) indicates the number of I/O fault occurring times for each disk apparatus, B(n) indicates the number of transfer time-out occurring times for each disk apparatus, C(n) indicates the number of link fault occurring times for each disk apparatus, and W1, W2, and W3 indicate a weighting coefficient.

Based on this equation, the MPU 11 obtains the suspect value X (n) for each disk apparatus and sets a descending order of the suspect values X(n) in which the disk apparatuses are to be disconnected. Also, the MPU 11 makes an adjustment that a suspect value X(n) of the disk apparatus having the disk identified as a suspect disk based on a result of actual diagnosis of the link may be larger than a suspect value X(n) of the other disk apparatuses (for example, it checks the number of occurring times of each error type for the disk identified as a suspect disk to then increase the weight of the error type with the largest number of occurring times and decrease the weight of the error type with the smallest number of occurring times). By this operation, as the link diagnosis proceeds, the suspect disk can be identified more easily.

The inter-adapter communication control unit 13 controls communication established between the disk adapters 10 and 20 in that for link diagnosis it instructs the counterpart disk adapter to bypass the port of each disk (that is, disconnect a specific FC-AL disk from the link) or requests it to perform I/O processing received during the diagnosis.

The port bypass control units 14 control the bypass circuits 32, 33, 42, 43, 52, and 53 of the respective disks to bypass a specific port in order to disconnect the relevant disk from the link or to release bypassing of the port to connect the disk once disconnected to the link.

In this embodiment, the FC-AL control unit 15 constitutes fault detecting unit. Also, the MPU 11 and the memory circuit 12 constitute fault history managing unit and node disconnection order setting unit. The bypass circuits 32, 33, 42, 43, 52, and 53 constitute port bypassing unit. Further, the MPU 11, the inter-adapter control unit 13, the port bypass control unit 14, and the FC-AL control unit constitute node disconnection control unit.

Figure 3:
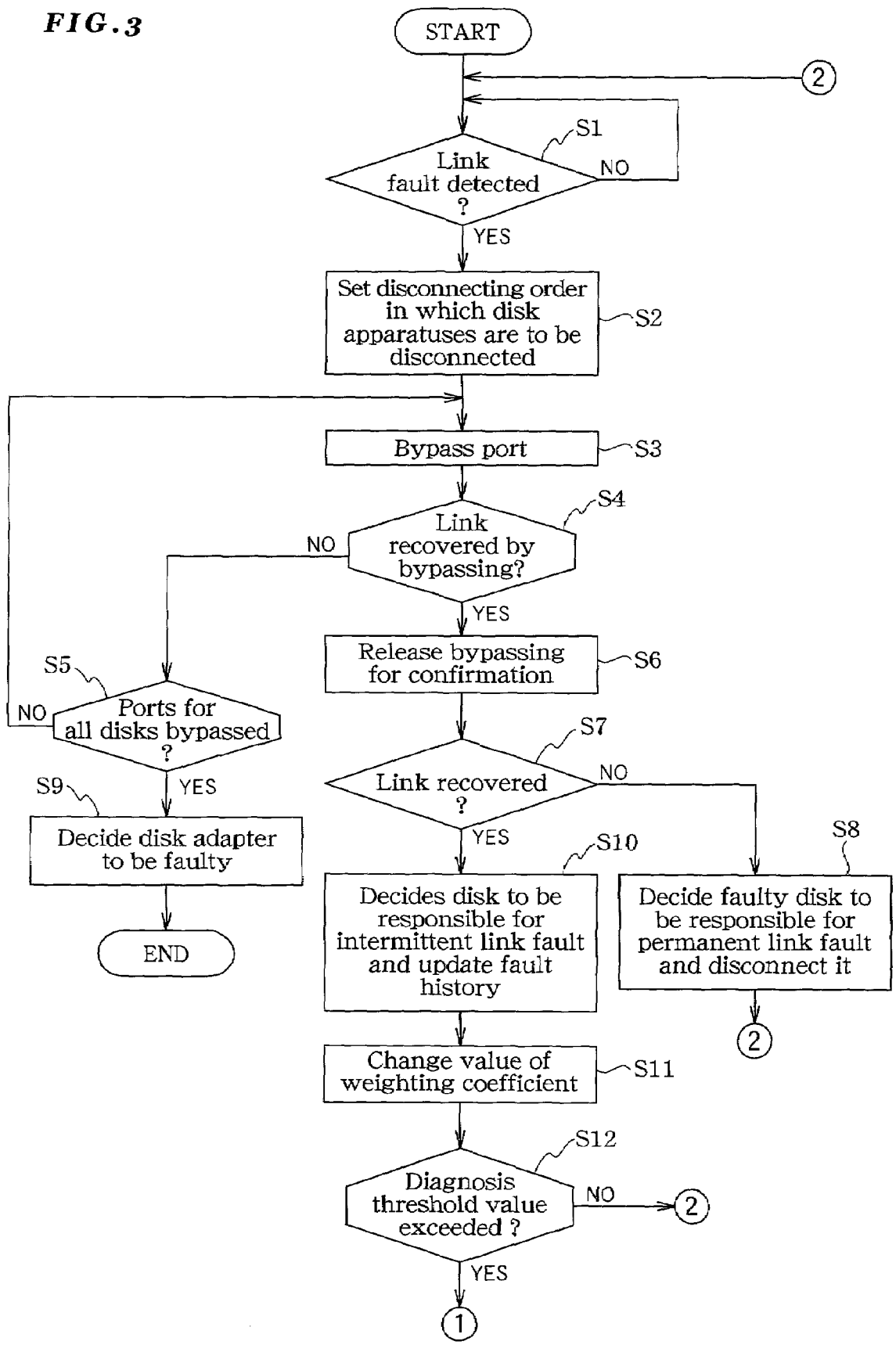
FIG. 3 is a flowchart for showing a link diagnosing method related to the present invention (part 1)
Figure 4:
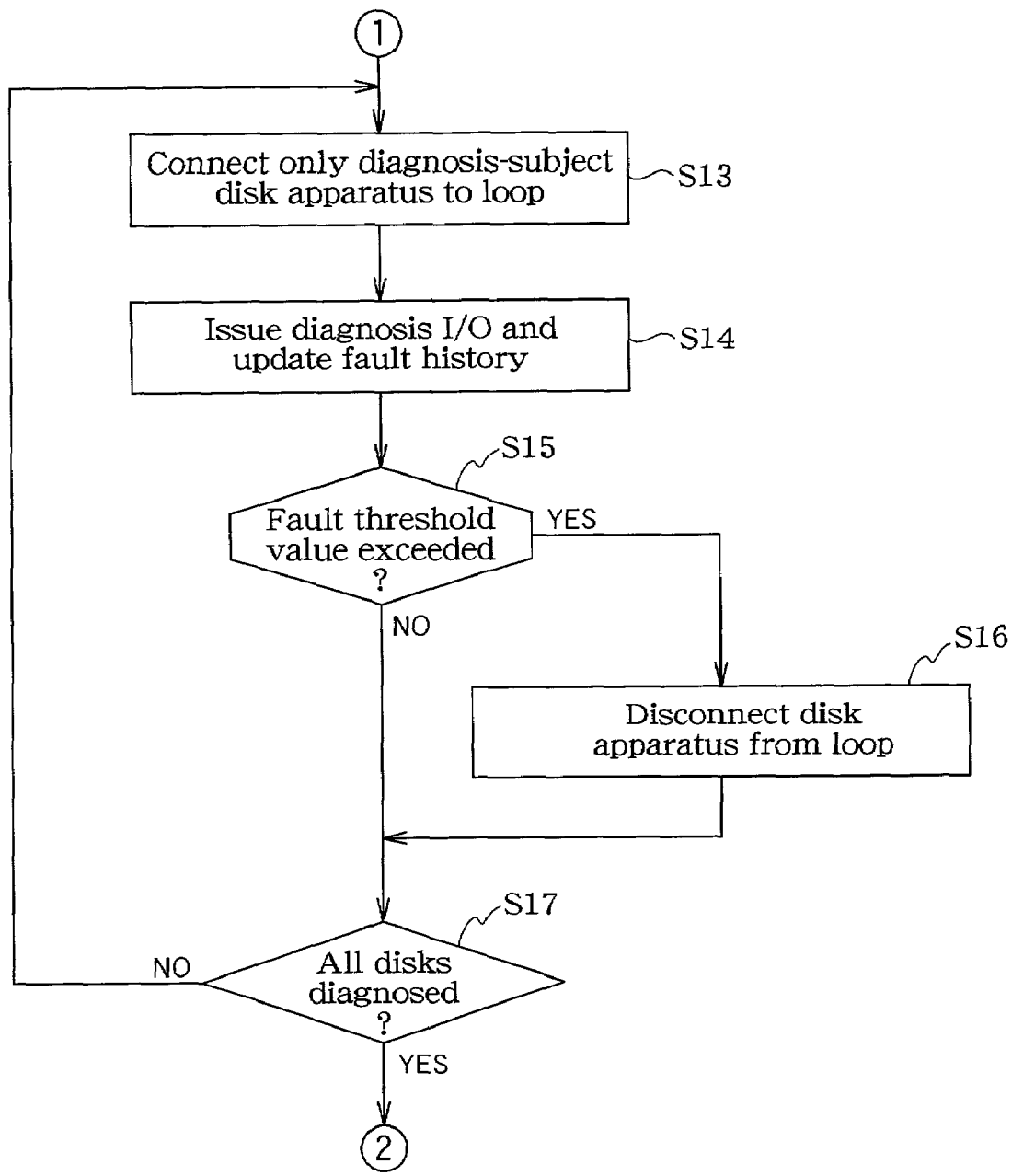
FIG. 4 is the flowchart for showing the link diagnosing method related to the present invention (part 2)

The following will describe a link diagnosing method if a link abnormality for which a certain disk apparatus is responsible occurred in one of the loops, along flowcharts of FIGS. 3 and 4.

The disk adapters 10 and 20 periodically monitors the state of the link during I/O processing, thus checking for the occurrence of a link abnormality. When no link abnormality is detected, they continue monitoring (step S1).

Figure 5:
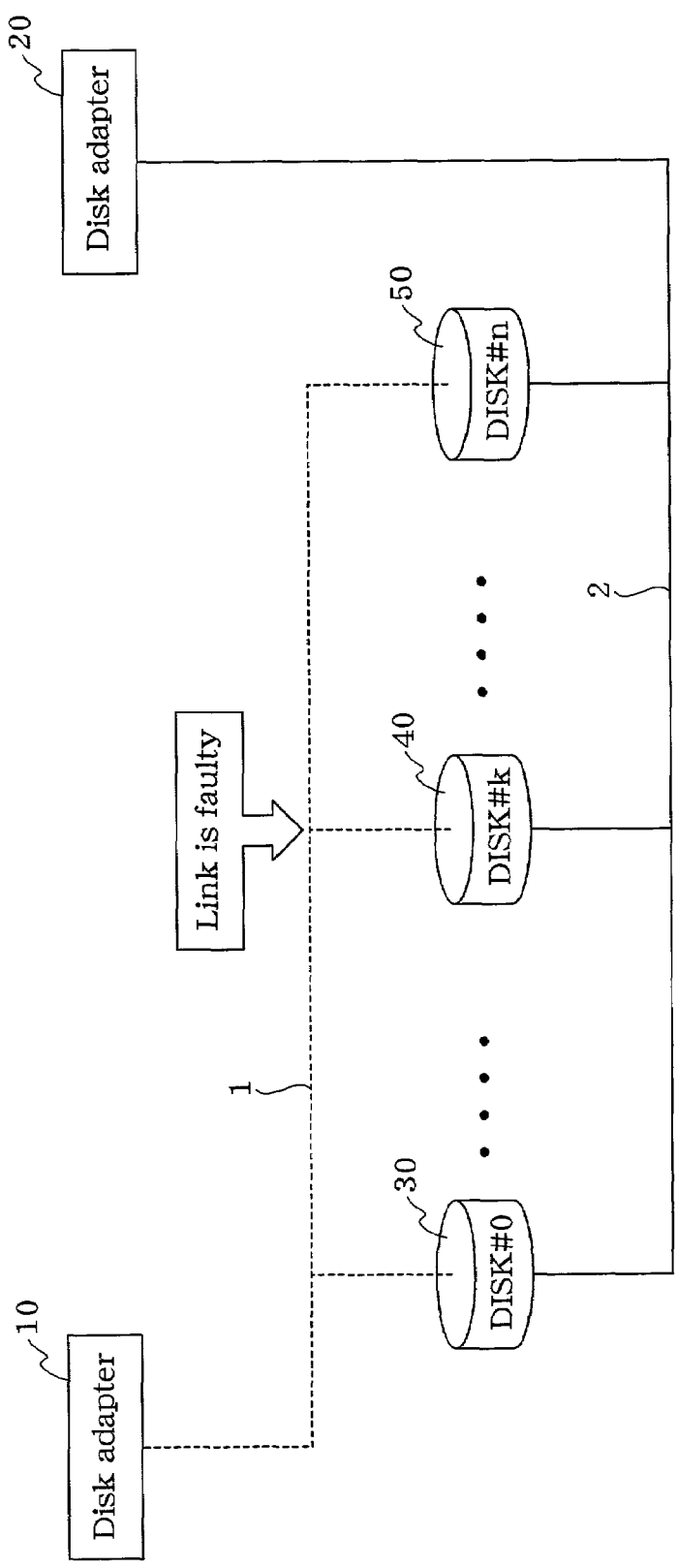
FIG. 5 is an illustration for showing a state where a link abnormality occurred in a loop on the side of a port A.

If a link abnormality occurred in the link 1 on the port A side, as shown in FIG. 5 this link abnormality is detected by the FC-AL control unit 15 of the disk adapter 10. The FC-AL control unit notifies the MPU 11 of the detection of the link abnormality.

When notified of the detection of the link abnormality, the MPU 11 reads out the fault occurrence history of each of the disk apparatuses stored in the memory circuit 12 to calculate a suspect value X(n) of each disk apparatus based on the above-mentioned Equation 1. It then sets a descending order of thus calculated suspect values X(n) in which these disk apparatuses are to be disconnected (step S2).

As shown in FIG. 5, in a state where a link abnormality occurred in the port A side loop 1, the disk adapter 10 which controls the loop 1 side cannot control the bypass circuits 32, 42, and 52. The MPU 11 of the disk adapter 10, therefore, supplies an instruction to provide a port-bypassed state of the port A side of the disk apparatus that has the largest suspect value X(n) via the inter-adapter communication control unit 13 to the disk adapter 20 which controls the port B side loop.

When having received this instruction to provide the port-bypassed state, the disk adapter 20 which controls the port B side loop supplies the port B side loop 2 with an instruction to set in a port-bypassed state the port A side of a specified one of the disk apparatuses. This instruction is received by the bypass circuit on the port B side of this specified disk apparatus and then supplied through inter-bypass circuit communication to the port A side bypass circuit. Thus, port bypassing is performed by the port A side bypass circuit of the specified disk apparatus to disconnect it from the loop 1 (step S3).

Figure 6:
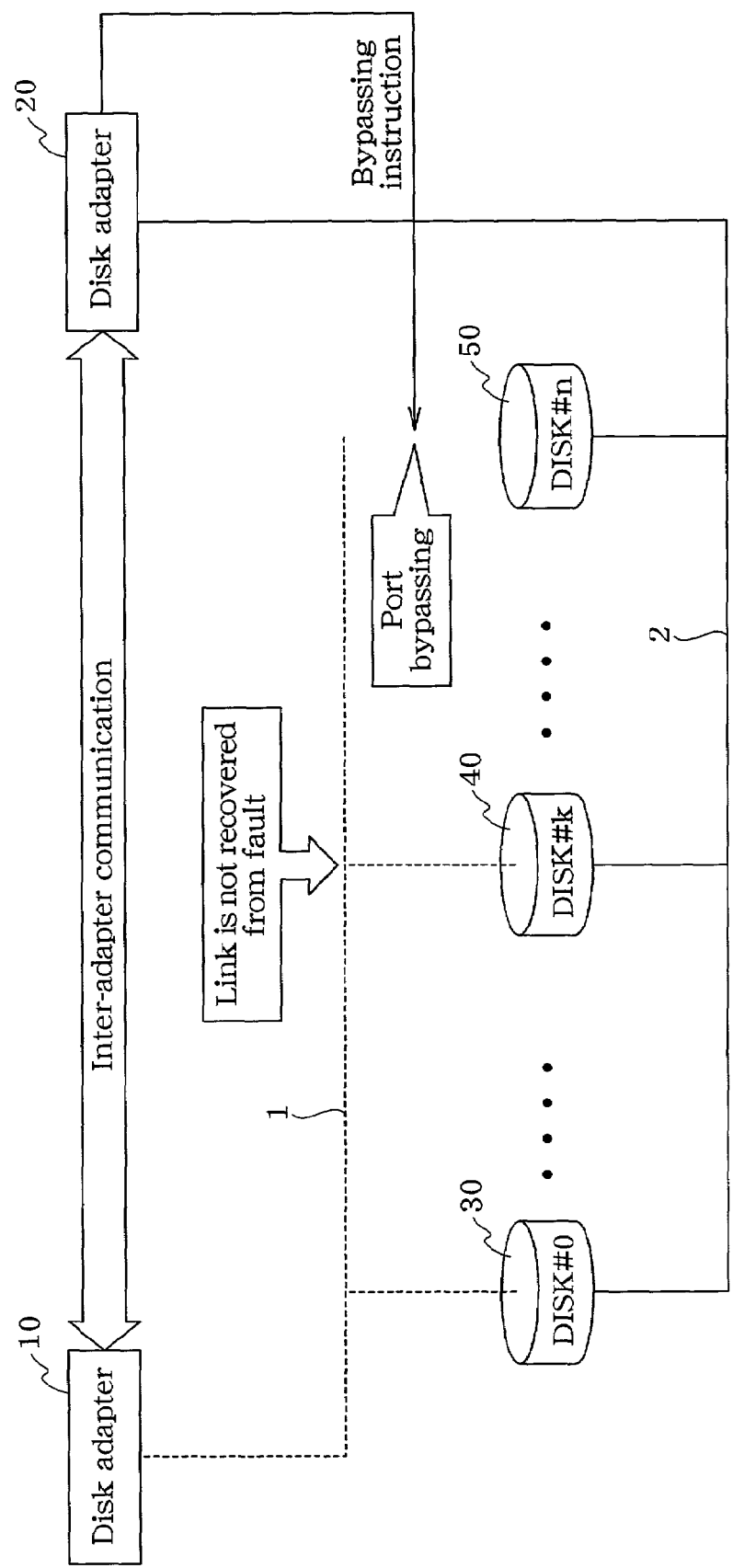
FIG. 6 is an illustration for showing a state where a link fault still continues even if disk #n is disconnected from the loop.

If, as shown in FIG. 6, disk #n has the largest suspect value X(n), it is disconnected from the loop Then, the disk adapter 10 monitors whether the link recovers resultantly when the disk apparatus with the largest suspect value X(n) was thus disconnected from the loop 1 (step S4) and, if it does not recover, performs port bypassing on the disk apparatus which has the second largest suspect value X(n). In such a manner, the disk adapter 10 disconnects the disk apparatuses in an descending order of the suspect values X(n) until the link recovers (step S5).

Figure 7:
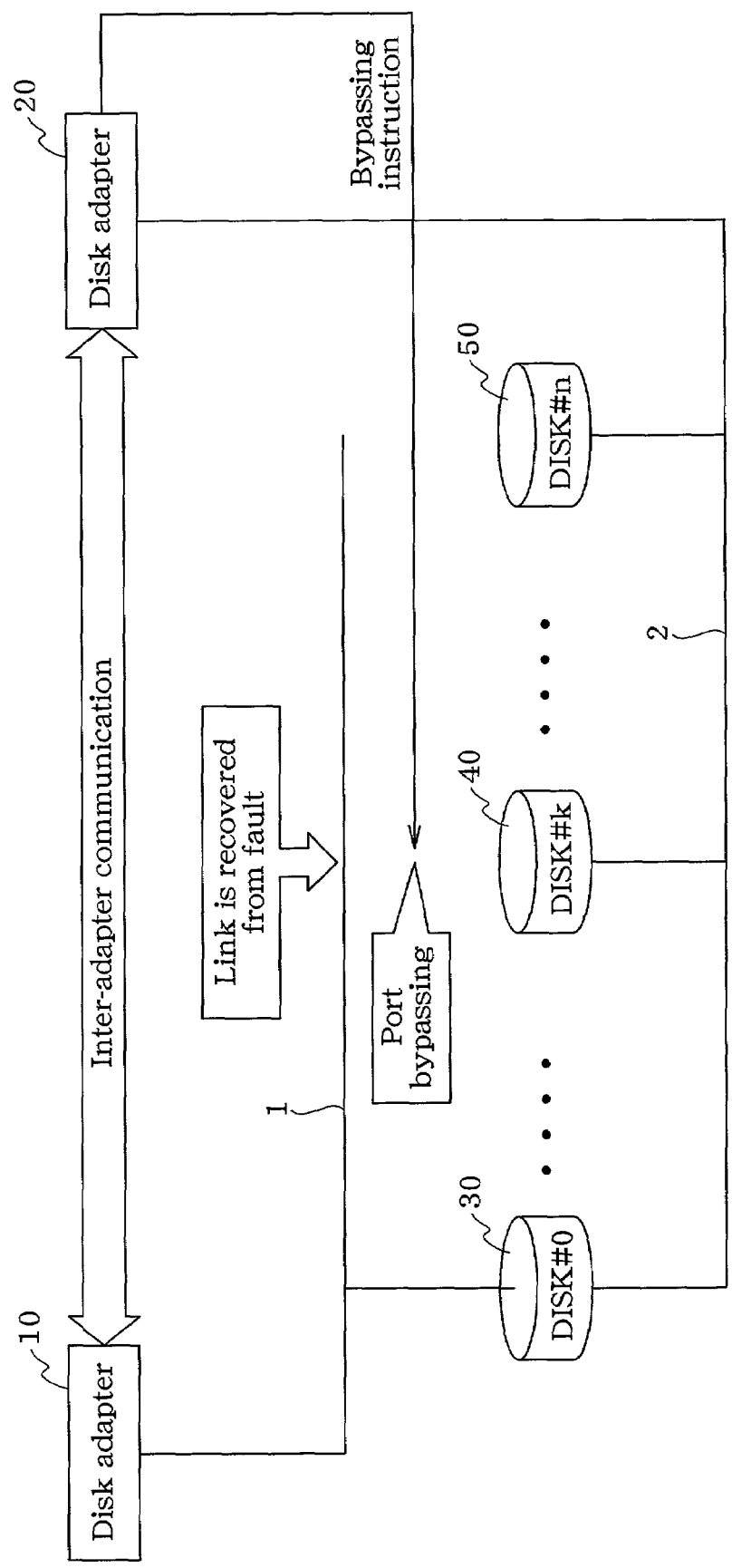
FIG. 7 is an illustration for showing a state where the link fault is recovered when disk #n and disk #K are disconnected from the loop.

If, as shown in FIG. 7, the link recovered resultantly when the disk apparatus was thus disconnected, the disk adapter 10 releases, for confirmation, the disk apparatus from the bypassed state to connect it to the loop again (step S6). It then monitors the link on whether it still stays recovered or encounters a link abnormality again (step S7).

If a link fault recurs (the link did not recover) resultantly when the bypassed state was thus released for confirmation, the disk adapter 10 decides that the disk apparatus once released from the bypassed state and connected to the loop 1 for confirmation has a permanent link fault and disconnects this disk apparatus from the loop 1 and also releases the other disk apparatuses from the bypassed state to connect them to the loop 1 (step S8).

Figure 8:
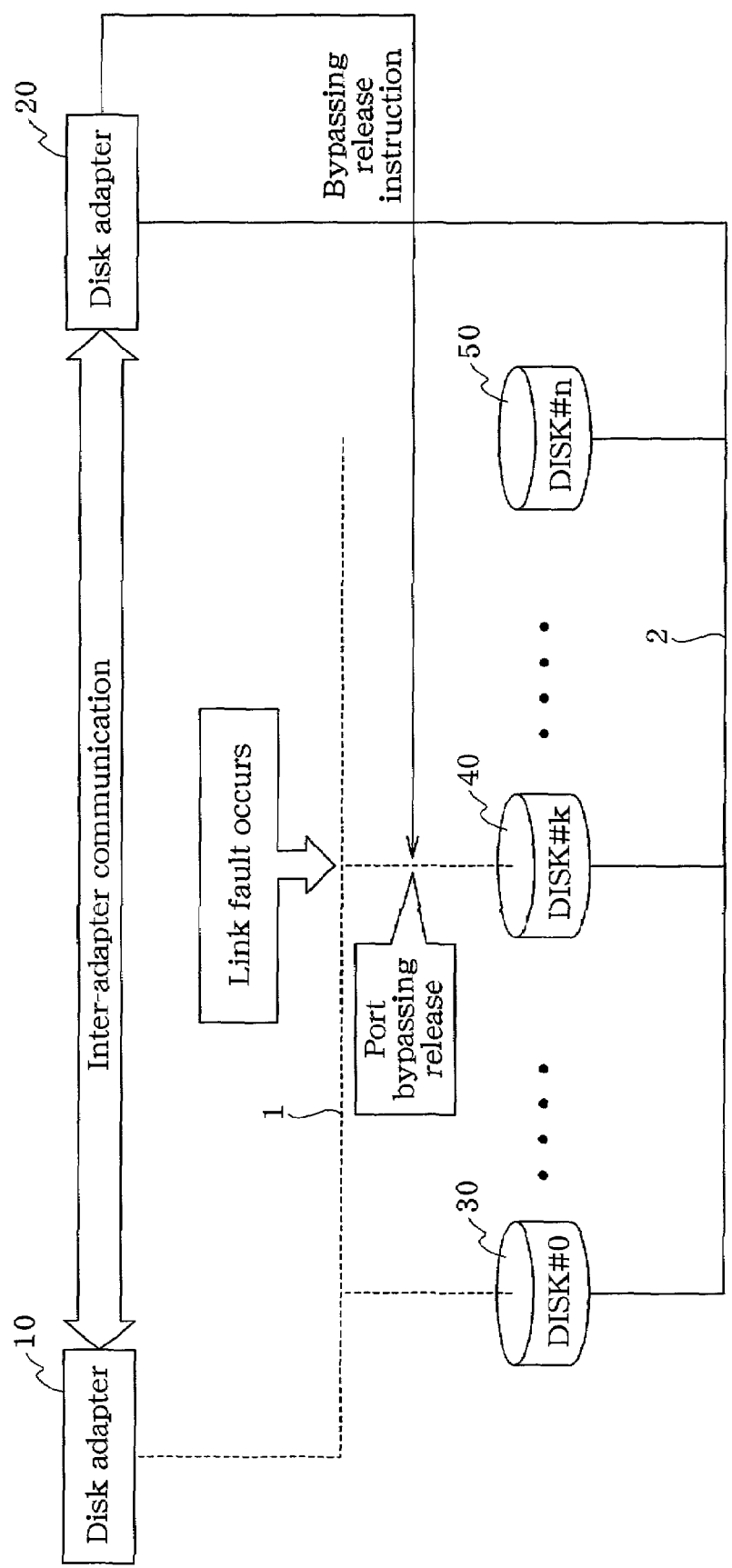
FIG. 8 is an illustration for showing a state where a link fault occurred when bypassing of disk #K was released for confirmation.
Figure 9:
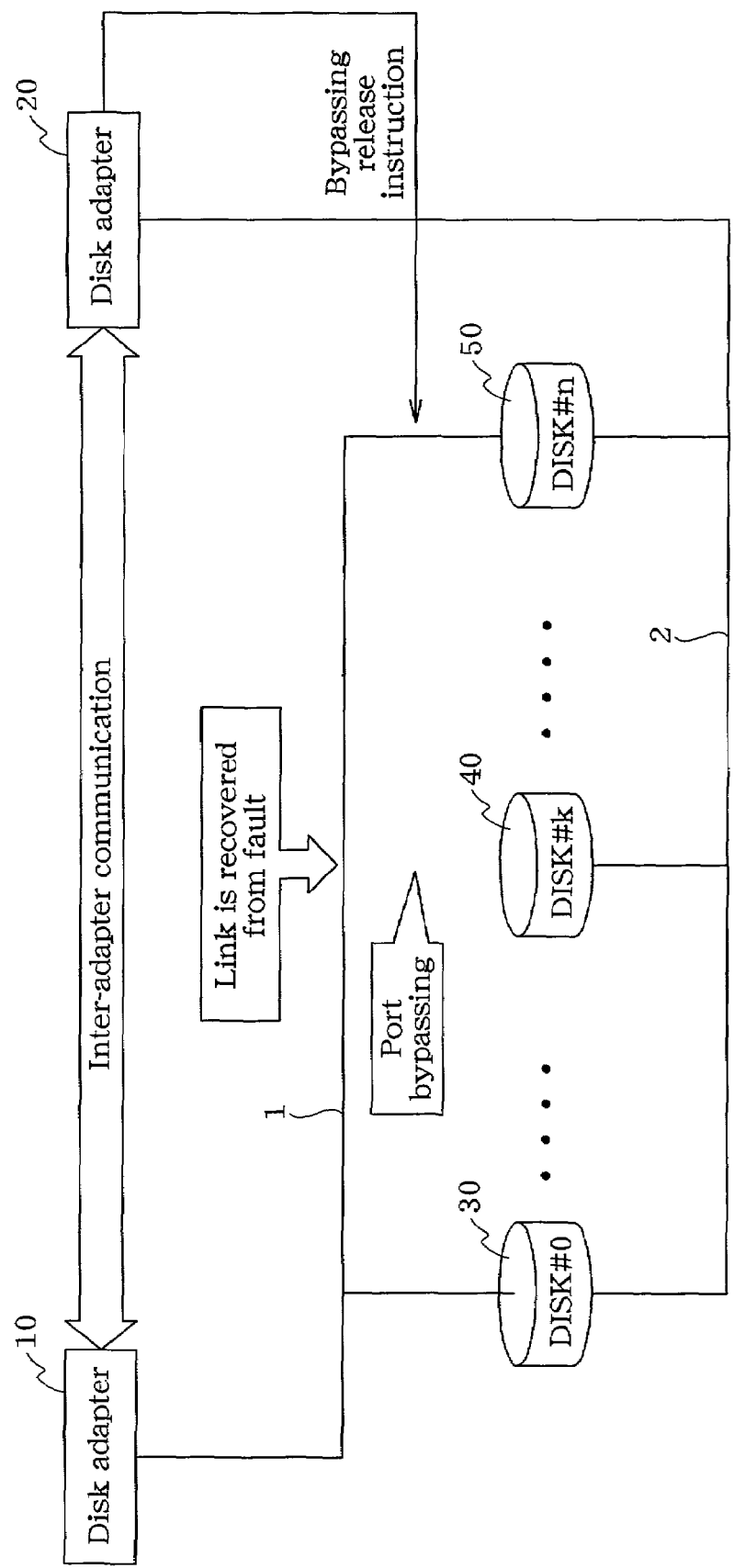
FIG. 9 is an illustration for showing a state where disk #K is decided to have a permanent link fault and disconnected from the loop to then connect another disk #n to the loop.

As shown in FIGS. 8 and 9, the loop 1 recovers from the link fault state resultantly when disk #K responsible for the fault was disconnected from the loop.

In this state, if the loop does not recover from the link fault state even when port bypassing was performed on all of the disk apparatuses in the descending order of the suspect values X(n) thereof, the disk adapter 10 itself is decided to have a fault (step S9).

Also, if the link fault does not occur even when the bypassed state is released for confirmation (if the link still stays as recovered from the fault), the MPU 11 of the disk adapter 10 decides that the disk apparatus that the link recovered when bypassing was performed thereon encountered an intermittent link fault, to then update the fault history of this disk apparatus (step S10). In this case, the disk apparatus disconnected from the loop previously is connected to the loop.

Then, if the disk apparatus decided to have encountered the intermittent link fault has a smaller suspect value X(n) than that of any other disk apparatuses, the MPU 11 of the disk adapter 10 adjusts the values of the weighting coefficients so that this disk apparatus decided to be of the intermittent link fault may have a larger suspect value X(n) than that of any other disk apparatuses (step S11). Specifically, the MPU 11 of the disk adapter 10 checks the number of fault occurring times for each of the fault items of the disk apparatus decided to be of the intermittent link fault to then increase the value of the weighting coefficient of the fault item having the largest number of times and decrease the value of that having the smallest number of times. It is thus possible to increase the rate of right guessing of a suspect disk, thus decreasing the time required to detect a faulty disk.

Figure 10:
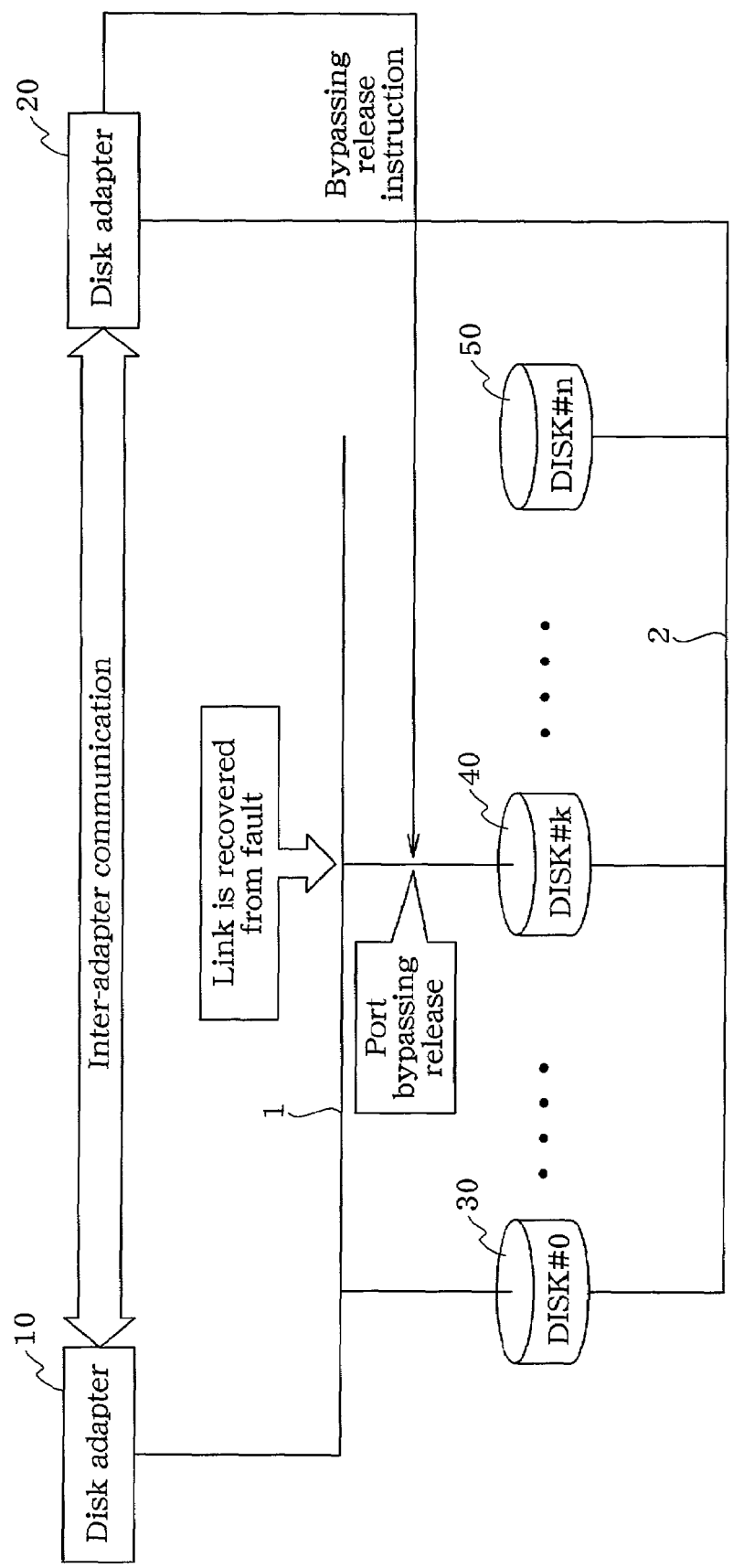
FIG. 10 is an illustration for showing a state where no link fault occurred when bypassing was released for confirmation.

FIG. 10 is an illustration for showing a state where no link fault occurred when bypassing was released for confirmation.

Figure 11:
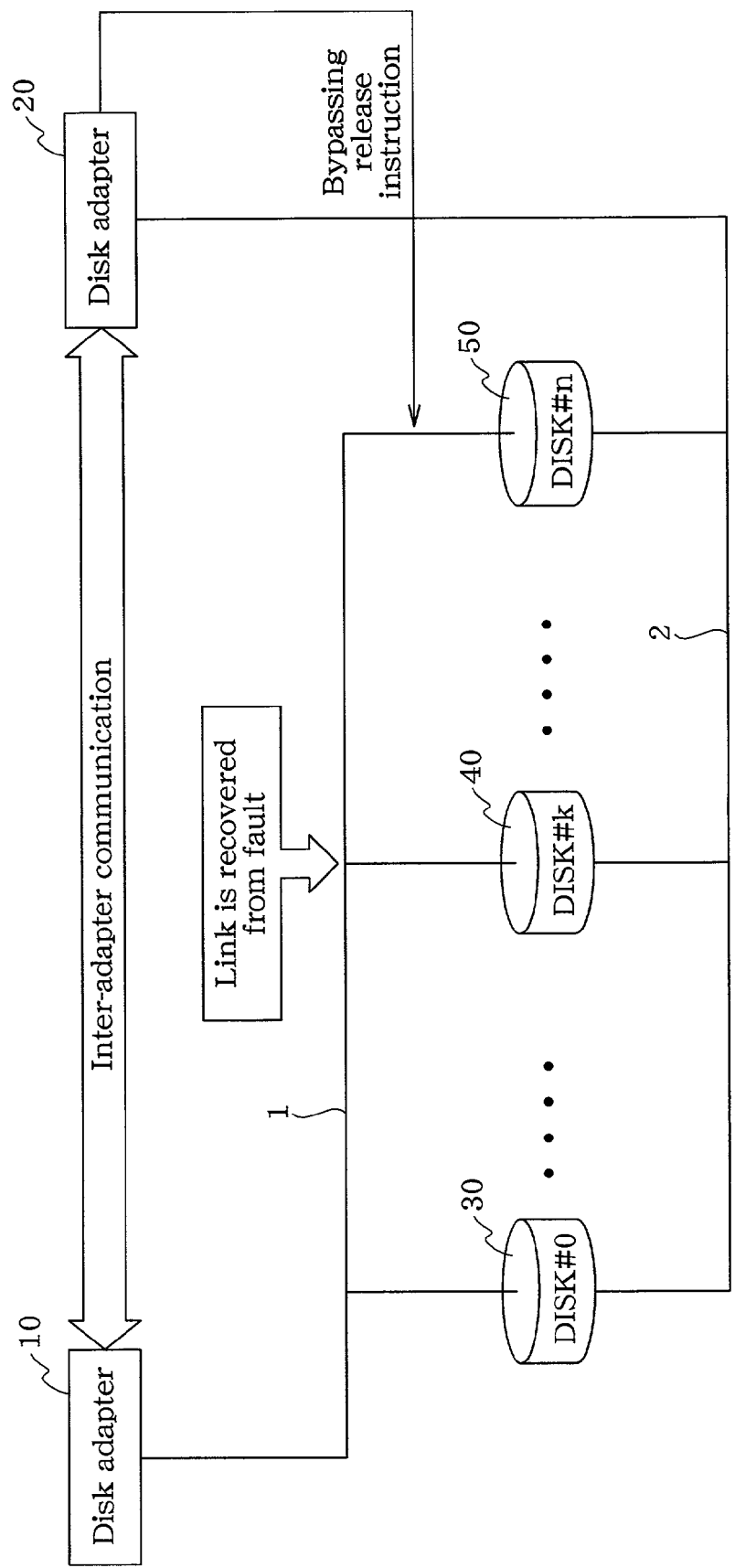
FIG. 11 is an illustration for showing a state where a disk decided to have an intermittent link fault and another disk are connected to the loop.

FIG. 11 is an illustration for showing a state where a disk decided to have an intermittent link fault and another disk are connected to the loop.

When having updated the fault history, the MPU 11 of the disk adapter 10 calculates the suspect value X(n) of each of the disk apparatuses to check whether any of these disk apparatuses has a value in excess of a preset diagnosis threshold value (step S12). If none of the disk apparatuses has a larger value than the diagnosis threshold value, it returns to step S1 to monitor whether the link encounters a fault, if there is any of the disk apparatuses which has a value in excess of the diagnosis threshold value, it performs the processing of step S13 and the subsequent shown in FIG. 4 (access processing for diagnosis).

At step S13, the MPU 11 generates a port bypassing instruction to the disk apparatuses other than the one to be diagnosed. With this, only the diagnosis-subject disk apparatus is connected to the port A side loop 1.

Figure 12:
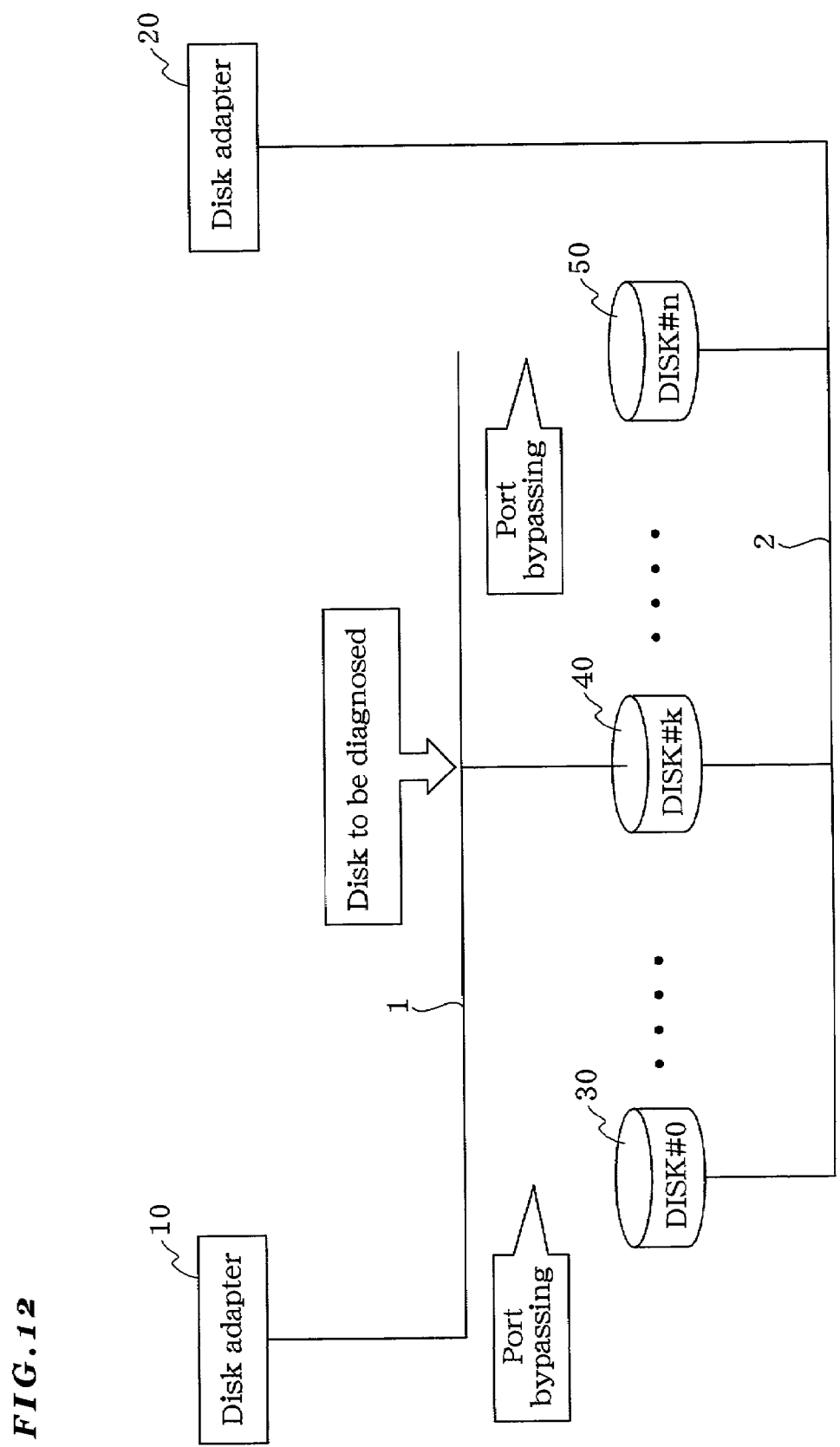
FIG. 12 is an illustration for showing state where only a diagnosis-subject disk apparatus was connected to the loop.

FIG. 12 is an illustration for showing state where only a diagnosis-subject disk apparatus was connected to the loop.

Next, the disk adapter 10 repeatedly makes diagnosis I/O access to the diagnosis-subject disk apparatus a preset number of times to monitor whether any type of errors (I/O fault, transfer time-out, and link fault) occurs and, if it occurs, updates the fault history (step S14). It is thus possible to promote the obtaining of the fault history data.

When the obtaining of the fault history data was thus promoted to thereby cause the suspect value X(n) of the diagnosis-subject disk apparatus to reach the preset fault threshold value (step S15), the disk adapter 10 decides that this disk apparatus is faulty and disconnects it from the loop (step S16).

The disk adapter 10 thus performs the processing of step S13 through step S16 repeatedly on all of the disk apparatuses (step S17). It is thus possible to early detect the disk apparatuses suspected to encounter a fault and disconnect them from the loop before a link fault occurs, thus preventing it from occurring actually beforehand.

Although this embodiment has been described with an example where a suspect value X(n) is obtained on the basis of a total sum of the values obtained by multiplying the number of fault occurring times for each of the fault types by each weighting coefficient so that an ascending order of thus obtained suspect values X(n) may be set in which the disk apparatuses are to be disconnected, these disk apparatuses may be disconnected in an ascending order of the numbers of link fault occurring times. Also, if the occurrence date of the faults is recorded, a dating-back order of the fault occurrence dates may be set or a descending order of the numbers of fault occurring times in a predetermined lapse of time (in a descending order of fault occurrence frequencies) may be set in which the disk apparatuses are to be disconnected.

Also, although this embodiment has exemplified an FC-AL system having the double-loop configuration, the system may not be of the double-loop configuration if it has an independent signal path for controlling port bypassing. In this case, port bypassing/bypassing releasing is controlled through the port bypassing control signal path.

Also, the present invention is achieved by a computer program product. That is, a computer program product for diagnosing an FC-AL (Fiber Channel Arbitrated loop) system link stored in storage medium (memory circuit etc.), wherein the program product instructs a computer for performing the processes of: managing a fault history for each of a plurality of node apparatuses connected in an FC-AL; setting a disconnecting order in which said node apparatuses are to be disconnected on the basis of said fault history; and supplying, upon occurrence of a link fault, said node apparatuses with a port bypassing instruction based on said disconnecting order to thereby disconnect said node apparatuses from the loop.

As mentioned above, since the FC-AL system link diagnosing method and apparatus related to the present invention manages a fault history for each node so that a node disconnecting order may be set on the basis of thus managed fault histories, it is possible to, upon occurrence of a link fault, sequentially disconnect the node in a descending order of the fault occurring possibilities, thus increasing the probability of detecting the faulty node early.

Also, the fault history records therein the number of occurring times for each of the fault contents beforehand, so that a total sum of the values of each fault contents-specific number of occurring times multiplied by each weighting coefficient can be obtained as a suspect value to thereby set a descending order of these suspect values in which the nodes are to be disconnected, thus increasing the probability of detecting the faulty node early.

Further, if the node thus detected to be faulty has a larger suspect value than that of the other nodes, each weighting coefficient can be adjusted so that the suspect value of this detected faulty node may be larger than that of the other nodes to thereby learn the conditions for calculating the suspect values, thus improving the rate of right guessing of the suspect nodes.

Also, if the suspect value reaches a diagnosis threshold value, it is possible to make diagnosis access to the relevant node apparatus a plurality of number of times, thus accelerating the collection of the fault histories. Further, if the suspect value reaches a preset fault threshold value (which is larger than the diagnosis threshold value), the relevant node apparatus can undergo port bypassing to be disconnected from the loop, thus preventing a alink fault from occurring beforehand.

The invention may be embodied in other specific forms without departing from the spirit or essential characteristic thereof. The present embodiments are therefore to be considered in all respects as illustrative and not restrictive, the scope of the invention being indicated by the appended Claims rather than by the foregoing description and all changes which come within the meaning and range of equivalency of the Claims are therefore intended to be embraced therein.

The entire disclosure of Japanese Patent Application No. 2001-180240 (Filed on Jun. 14, 2001) including specification, claims, drawings and summary are incorporated herein by reference in its entirety.

What is claimed is:

1. An FC-AL (Fiber Channel Arbitrated loop) system link diagnosing method comprising:
   managing a fault history for each of a plurality of node apparatuses connected in a loop as an FC-AL;
   setting a disconnecting order in which said node apparatuses are to be disconnected on a basis of said fault history; and
   supplying, upon occurrence of a link fault, each of said node apparatuses with a port bypassing instruction based on said disconnecting order to thereby disconnect said node apparatuses from the loop.

2. The FC-AL system link diagnosing method according to claim 1, wherein if said link fault is recovered by performing port bypassing on any of said node apparatuses, the port bypassing of said node is released and, if the link fault occurs resultantly, said node is disconnected from the loop.

3. The FC-AL system link diagnosing method according to claim 1, wherein said fault history records therein a number of link fault occurring times, so that said disconnecting order is set to provide a descending sequence of said link fault occurring times.

4. The FC-AL system link diagnosing method according to claim 1, wherein said fault history records therein a fault contents-specific number of occurring times, so that said disconnecting order is set to provide a descending sequence of suspect values, each obtained by multiplying said fault contents-specific number of occurring times by a weighting coefficient.

5. The FC-AL system link diagnosing method according to claim 4, wherein at least one said weighting coefficient is changed in value so that a suspect value of the node apparatus decided to be responsible for the link fault may be larger than the suspect value of any other node apparatuses.

6. The FC-AL system link diagnosing method according to claim 1, wherein said fault history records therein a fault contents-specific number of occurring times, so that when a suspect value obtained by multiplying said fault contents-specific number of occurring times by a weighting coefficient has reached a preset diagnosis threshold value, diagnosis access is made to said node apparatus a plurality of number of times, and if the fault is detected resultantly, the fault history is updated.

7. The FC-AL system link diagnosing method according to claim 1, wherein said fault history records therein a fault contents-specific number of occurring times, so that when a suspect value obtained by multiplying said fault contents-specific number of occurring times by a weighting coefficient has reached a preset fault threshold value, the relevant node apparatus is subjected to port bypassing to be disconnected from the loop.

8. An FC-AL system link diagnosing apparatus comprising:
   a fault detecting unit for detecting a fault in a system comprised of a plurality of node apparatuses connected in a loop as an FC-AL;
   a fault history managing unit for recording as fault history data the node apparatus which encountered the fault and contents of said fault in correspondence with each other;
   a port bypassing unit for performing port bypassing on said node apparatus to disconnect said node apparatus from the loop;
   a node disconnecting order setting unit for setting a disconnecting order in which said node apparatuses are to be from the loop upon occurrence of the link fault, based on said fault history data; and
   a node disconnection control unit for controlling disconnection of each of said node apparatuses based on the disconnecting order for said node apparatuses which is set by said node disconnecting order setting unit, when the link fault is detected.

9. The FC-AL system link diagnosing apparatus according to claim 8, wherein said node disconnecting order setting unit calculates a suspect value for each of said node apparatuses based on said fault history data to thereby set the disconnecting order in which said node apparatuses are to be disconnected in a descending order of the calculated suspect values thereof.

10. The FC-AL system link diagnosing apparatus according to claim 8, wherein said fault history data recorded contains a number of occurring times for each of the fault contents, so that said node disconnecting order setting unit calculates a suspect value for each of said node apparatuses by multiplying said number of occurring times for each of said fault contents by a weighting coefficient to thereby set the disconnecting order in which said node apparatuses are to be disconnected in a descending order of the calculated suspect values.

11. The FC-AL system link diagnosing apparatus according to claim 10, wherein said node disconnecting order setting unit changes at least one weighting coefficient in value so that the suspect value of the node apparatus decided to be responsible for said link fault may be larger than the suspect value of any other node apparatuses.

12. The FC-AL system link diagnosing apparatus according to claim 8, wherein if said link failure is recovered resultantly when said node apparatus is disconnected from the loop through said port bypassing unit, said node disconnection control unit releases the port bypassing of said node apparatus and, if the link failure occurs resultantly, disconnects said node apparatus from the loop.

13. An FC-AL system link diagnosing apparatus comprising:
   a fault detecting unit for detecting a fault in a system comprised of a plurality of node apparatuses connected in a loop as an FC-AL;
   a fault history managing unit for recording as fault history data the node apparatus which encountered the fault and contents of said fault in correspondence with each other;
   a port bypassing unit for performing port bypassing on said node apparatus to disconnect said node apparatus from the loop;

a diagnosis access making unit for making diagnosis access to said node apparatus a plurality of number of times to thereby promote obtaining of said fault history data;

a node disconnecting order setting unit for setting a disconnecting order in which said node apparatuses are to be from the loop upon occurrence of the link fault, based on said fault history data; and a node disconnection control unit for controlling disconnection of each of said node apparatuses based on the disconnecting order for said node apparatuses which is set by said node disconnecting order setting unit, when the link fault is detected.

14. The FC-AL system link diagnosing apparatus according to claim 13, wherein said fault history data recorded contains a number of occurring times for each of the fault contents, so that said node disconnecting order setting unit calculates a suspect value for each of said node apparatuses by multiplying said number of occurring times for each of said fault contents by a weighting coefficient to thereby set the disconnecting order in which said node apparatuses are to be disconnected in a descending order of the calculated suspect values.

15. The FC-AL system link diagnosing apparatus according to claim 14, wherein said node disconnecting order setting unit changes at least one weighting coefficient in value so that the suspect value of the node apparatus decided to be responsible for said link fault may be larger than the suspect value of any other node apparatuses.

16. The FC-AL system link diagnosing apparatus according to claim 13, wherein if said link failure is recovered resultantly when said node apparatus is disconnected from the loop through said port bypassing unit, said node disconnection control unit releases the port bypassing of said node apparatus and, if the link failure occurs resultantly, disconnects said node apparatus from the loop.

17. A computer program product embodying a program of computer-readable instructions executable by a computer to perform a method of diagnosing an FC-AL (Fiber Channel Arbitrated loop) system link, said method comprising:

managing a fault history for each of a plurality of node apparatuses connected in a loop as an FG-AL;

setting a disconnecting order in which said node apparatuses are to be disconnected on a basis of said fault history; and supplying, upon occurrence of a link fault, said node apparatuses with a port bypassing instruction based on said disconnecting order to thereby disconnect said node apparatuses from the loop.

18. The computer program product according to claim 17, wherein said fault history data recorded contains a number of occurring times for each of the fault contents, so that said node disconnecting order setting unit calculates a suspect value for each of said node apparatuses by multiplying said number of occurring times for each of said fault contents by a weighting coefficient to thereby set the disconnecting order in which said node apparatuses are to be disconnected in a descending order of the calculated suspect values.

19. The computer program product according to claim 18, wherein said node disconnecting order setting unit changes at least one weighting coefficient in value so that the suspect value of the node apparatus decided to be responsible for said link fault may be larger than the suspect value of any other node apparatuses.

20. The computer program product according to claim 17, wherein if said link failure is recovered resultantly when said node apparatus is disconnected from the loop through said port bypassing unit, said node disconnection control unit releases the port bypassing of said node apparatus and, if the link failure occurs resultantly, disconnects said node apparatus from the loop.

* * * * *